Patented Nov. 13, 1934

1,980,162

UNITED STATES PATENT OFFICE 1,980,162

PURE 1 - AMINO - 2,3 - DIMETHYLANTHRAQUINONE AND PROCESS OF MAKING SAME

Otto Bayer, Leverkusen-on-the-Rhine, Germany, assignor to General Aniline Works, Inc., New York, N. Y., a corporation of Delaware No Drawing. Application January 22, 1934, Serial No. 707,847. In Germany February 4, 1933

2 Claims. (Cl. 260—60)

This invention relates to pure 1-amino-2,3-dimethylanthraquinone and a process of making same.

2,3-dimethylanthraquinone and its derivatives have not found technical application hitherto since when they are prepared in the customary manner by ring closure of 3',4'-xyloyl-2-benzoic acid simultaneously about a quarter of the weight of 1,2-dimethylanthraquinone is formed, from which 2,3-dimethylanthraquinone can be separated only by repeated recrystallization with large losses.

In accordance with my present invention pure 1-amino-2,3-dimethylanthraquinone is manufactured in a smooth manner. The process of the invention is by nitrating a crude mixture of isomeric 1,2- and 2,3-dimethylanthraquinone with at least one molecular proportion of nitric acid, advantageously in the presence of sulfuric acid, then reducing the nitro group thus introduced and separating the mixture of the isomeric amino-dimethyl-anthraquinone formed by taking advantage of the different solubilities of the sulfates in water containing sulfuric acid. In this manner at first the sulfate of pure 1-amino-2,3-dimethylanthraquinone separates almost entirely. It is filtered off and decomposed by means of water. In the filtrate are found the essentially more soluble by-products consisting substantially of the mono- and diamino-derivatives of 1,2-dimethyl-anthraquinone.

The 1-amino-2,3-dimethylanthraquinone which is easily obtainable according to the present method in a very pure state and which is capable of various conversion reactions represents a valuable intermediate for the production of dyestuffs.

In order to further illustrate my invention the following example is given; but I wish it to be understood that I am not limited to the particular products or reacting conditions stated therein.

Example 400 parts of 3',4'-xyloyl-2-benzoic acid of melting point 163–165° C. which may have been previously purified by dissolving in a dilute caustic soda lye, are dissolved in about 4000 parts of sulfuric acid monohydrate and during about half to one hour the solution is heated to 90–100° C. whereby in an almost theoretical yield a mixture of about 3 proportions of 2,3-dimethyl- and about 1 proportion of 1,2-dimethylanthraquinone is formed. The mass is cooled to —5° C. and during about half an hour a nitrating mixture is added consisting of 115 parts of nitric acid and 500 parts of sulfuric acid, care being taken that the reaction temperature does not exceed 0° C. After stirring for some hours at room temperature the mass is poured on ice, the precipitate formed is filtered off and washed.

The moist precipitate consisting of a mixture of isomeric nitro-dimethylanthraquinones is reduced in the known manner, for instance by means of sodium sulphide.

The isolated reaction product is dissolved in a moist state, for example 1050 parts thereof containing 385 parts of dry product of melting point 170–195° C. in about 5000 parts of sulfuric acid of 66° Bé. and then about 900 parts of water are added the temperature slowly increasing to about 100° C. The sulfate of 1-amino-2,3-dimethyl-anthraquinone which separates is filtered off at about 40° C. and washed with water containing sulfuric acid of about the same strength. The precipitated sulfate is decomposed by means of hot water.

The 1-amino-2,3-dimethylanthraquinone thus obtained is free from isomers and melts at 211–213° C. When recrystallized from glacial acetic acid it forms dark red needles of melting point 213° C. The yield is about 200 parts.

By adding to the filtrate of the precipitated sulfate a further quantity of about 500 parts of water a further 56 parts of 1-amino-2,3-dimethylanthraquinone of melting point 208–210° C. are made available so that practically the entire quantity of the 1-amino-2,3-dimethylanthraquinone formed can be separated from the by-products.

I claim:

1. A process of making pure 1-amino-2,3-dimethylanthraquinone which comprises nitrating a crude mixture of isomeric 1,2- and 2,3-dimethylanthraquinone with at least one molecular proportion of nitric acid, then reducing the nitro group thus introduced and separating the mixture of the isomeric amino-dimethylanthraquinones formed by taking advantage of the different solubilities of the sulfates in water containing sulfuric acid.

2. Pure 1 - amino-2,3-dimethylanthraquinone crystallizing from glacial acetic acid as dark red needles of melting point 213° C.

OTTO BAYER.